(12) United States Patent
Yang et al.

(10) Patent No.: US 7,646,736 B2
(45) Date of Patent: *Jan. 12, 2010

(54) VIDEO CONFERENCING SYSTEM

(75) Inventors: Chih-Lung Yang, Gilbert, AZ (US);
Chen-Yuan Kuo, Gilbert, AZ (US)

(73) Assignee: Exedra Technology, LLC, Gilbert, AZ (US)

( * ) Notice: Subject to any disclaimer, the term of this patent is extended or adjusted under 35 U.S.C. 154(b) by 875 days.

This patent is subject to a terminal disclaimer.

(21) Appl. No.: 11/071,147

(22) Filed: Mar. 3, 2005

(65) Prior Publication Data

US 2005/0140780 A1 Jun. 30, 2005

Related U.S. Application Data

(63) Continuation of application No. 10/212,831, filed on Aug. 5, 2002, now abandoned, which is a continuation-in-part of application No. 09/906,459, filed on Jul. 16, 2001, now Pat. No. 6,535,240.

(51) Int. Cl.
*H04L 12/16* (2006.01)
*H04N 7/14* (2006.01)
(52) U.S. Cl. .................................. 370/263; 348/14.09
(58) Field of Classification Search ......... 370/259–261; 348/14, 14.09
See application file for complete search history.

(56) References Cited

U.S. PATENT DOCUMENTS

| | | | |
|---|---|---|---|
| 5,003,532 A | | 3/1991 | Ashida et al. |
| 5,440,683 A | | 8/1995 | Nally et al. |
| 5,453,780 A | * | 9/1995 | Chen et al. ............... 348/14.07 |
| 5,548,324 A | | 8/1996 | Downs et al. |
| 5,646,678 A | * | 7/1997 | Bonja et al. ............... 348/14.07 |
| 5,671,377 A | | 9/1997 | Bleidt et al. |
| 5,691,768 A | | 11/1997 | Civanlar et al. |
| 5,764,277 A | | 6/1998 | Loui et al. ............... 348/14.01 |
| 5,903,563 A | | 5/1999 | Rashid et al. |
| 5,963,547 A | | 10/1999 | O'Neil et al. ............... 370/260 |
| 6,128,649 A | | 10/2000 | Smith et al. |

(Continued)

FOREIGN PATENT DOCUMENTS

EP 0523299 1/1993

(Continued)

OTHER PUBLICATIONS

Da-Jin Shiu et al., "A DCT-Domain H.263 Based Video Combiner For Multipoint Continuous Presence Video Conferencing", Multimedia Computing and Systems, 1999, IEEE International Conference on Florence, Italy Jun. 7-11, 1999, Los Alamitos, CA, USA, IEEE Comput. Soc., US Jun. 7, 1999, pp. 77-81, XP010519359 ISBN: 0-7695-0253-9.

(Continued)

*Primary Examiner*—Steven H Nguyen
(74) *Attorney, Agent, or Firm*—Christopher P. Maiorana, P.C.

(57) ABSTRACT

A method configured to continuously receive frames from a plurality of video channels and transmit to each of a plurality of participants in a video conference individual frames containing information concerning each of the video channels. The method only transmits at any given instant new picture data for one of the participants in the video conference.

19 Claims, 7 Drawing Sheets

U.S. PATENT DOCUMENTS

| | | | |
|---|---|---|---|
| 6,141,062 A | 10/2000 | Hall et al. | |
| 6,147,695 A | 11/2000 | Bowen et al. | |
| 6,195,116 B1 | 2/2001 | Lee | |
| 6,198,500 B1 | 3/2001 | Watanabe et al. | |
| 6,285,661 B1 * | 9/2001 | Zhu et al. | 370/260 |
| 6,288,740 B1 | 9/2001 | Lai et al. | 348/14.09 |
| 6,300,973 B1 | 10/2001 | Feder et al. | 348/14.09 |
| 6,441,841 B1 * | 8/2002 | Tanoi | 348/14.07 |
| 6,584,077 B1 | 6/2003 | Polomski | 370/263 |
| 6,606,112 B1 * | 8/2003 | Falco | 348/14.12 |
| 7,245,660 B2 * | 7/2007 | Yona et al. | 375/240.13 |

FOREIGN PATENT DOCUMENTS

| | | |
|---|---|---|
| EP | 11041756 | 10/2000 |
| WO | WO99/35660 | 7/1999 |
| WO | WO00/13147 | 3/2000 |
| WO | WO00/74373 | 12/2000 |
| WO | WO01/22735 | 3/2001 |

OTHER PUBLICATIONS

Sun, M-T et al., "A Coded-Domain Video Combiner For Multipoint Continuous Presence Video Conference", IEEE Transactions on Circuits and Systems For Video Technology, IEEE Inc., New York, US, vol. 7, No. 6, Dec. 1, 1997, pp. 855-863, XP000729341 ISSN: 1051-8215.

Shaw-Min Lei et al., "Video Bridging Based on H.261 Standard", IEEE Transactions on Circuits and Systems for Video Technology, vol. 4, No. 4, Aug. 1994, IEEE Inc. New York, US, pp. 425-436, XP000464656.

Chia-Wen Lin et al., "Dynamic Rate Control in Multipoint Video Transcoding", IEEE International Symposium on Circuits and Systems, May 28-31, 2000, pp. II-17 through II-20, XP010502649.

* cited by examiner

PICTURE B NEEDS TO CHANGE ITS GROUP NUMBER

PICTURE C NEEDS TO CHANGE ITS GROUP NUMBER

PICTURE D NEEDS TO CHANGE ITS GROUP NUMBER

| | |
|---|---|
| I PICTURE | |

| INTRA MBs | NOT COD |
|---|---|
| NOT COD | NOT COD |

P PICTURE

| | |
|---|---|
| P PICTURE | |

| INTER MBs | NOT COD |
|---|---|
| NOT COD | NOT COD |

P PICTURE

WHEN THE QCIF PICTURE IS PUT INTO THE CIF PICTURE STRUCTURE, ITS GROUP NUMBERS (GN) NEED TO CHANGE TO THE CORRESPONDING GN OF THE CIF PICTURE. FOR EXAMPLE, IF THE QCIF PICTURE IS PUT INTO THE LOWER RIGHT CORNER, THEN GN 1 SHOULD CHANGE TO 8, 3 TO 10 AND 5 TO 12.

| 1 | 2 |
|---|---|
| 3 | 4 |
| 5 | 6 |
| 7 | 8 |
| 9 | 10 |
| 11 | 12 |

GROUP NUMBERS
OF CIF PICTURE

| 1 |
|---|
| 3 |
| 5 |

GROUP NUMBERS
OF QCIF PICTURE

FIG. 6

VIDEO CONFERENCING SYSTEM

This is a continuation of U.S. Ser. No. 10/212,831, filed Aug. 5, 2002 now abandoned, which is a continuation-in-part of U.S. Ser. No. 09/906,459, filed Jul. 16, 2001, now U.S. Pat. No. 6,535,240.

FIELD OF THE INVENTION

This invention relates to video conferencing.

More particularly, the invention relates to a method and apparatus for video conferencing which significantly simplifies and reduces the expense of video conferencing equipment which continuously receives a video signal from each of two or more participants, combines the video signals into a single collective signal, and retransmits to each of the participants the collective signal so that each participant can view simultaneously himself or herself on a video screen along with the other participants.

In a further respect, the invention relates to a method and apparatus for video conferencing which receives a video frame from a participant and alters the headers and coded domain data, if necessary, in the frame without altering, in whole or in part, the pixel domain data which defines the picture transmitted with the frame.

In another respect, the invention relates to a method and apparatus for video conferencing which transmits to participants only the new information in one video channel at a time.

Video conferencing permits two or more participants to communicate both verbally and visually. The use of equipment which permits video conferencing has experienced only moderate growth in recent years because of cost, bandwidth limits, compatibility problems, and the limited advantages inherent in face-to-face meetings as compared to the traditional audio conference accomplished via telephone.

BACKGROUND OF THE INVENTION

Many commercially available video conferencing systems, including those video units which use the H.320, H.323 and H.324 envelope-protocols for call set up, call control plus audio and video coding-decoding or codec formats (H.320 is the protocols for ISDN network, H.323 for the LAN network and H.324 for the standard phone or POTS connections), only provide point-to-point video conferencing. Multi-point video conferencing requires the use of an MCU (multi-point control or conference unit). A MCU can operate either in a switched presence mode or continuous presence mode. In switched presence mode, only one video stream is selected and transmitted to all the participants based either on the audio signal or "chairman" switch control. In continuous presence mode, the MCU receives video signals from each participant in a video conference and combines the signals to produce a single hybrid signal, and sends the hybrid signal back to each participant. The hybrid signal enables each participant to view on one screen the pictures of the other participants along with his or her own picture on a real time basis using a split-screen. The sophisticated structure and large computation power of an MCU presently ordinarily require that it resides on a central server. Some providers of MCU systems claim that their MCU software can be operated on a desktop personal computer (PC). However, such MCU systems apparently support only the switched presence multi-point operation or they produce a video stream in proprietary formats which require each participant to install special video conferencing software or apparatus. Some of the factors that have made conventional MCU systems complicated follow:

1. The H.263 codec format permits the continuous presence mode. In the continuous presence mode, a MCU receives four video streams from the participants, makes some header changes, and sends them back without combining them. The computer or other apparatus of each participant needs to decode and display all four video streams to see the pictures of all the participants. The H.261 codec format does not, however, permit the continuous presence mode. The H.261 is the required codec format for the H.323 video unit. H.263 is an optional codec format. In addition, some existing systems that run H.263 do not support the continuous presence mode which is optional in H.263.

2. Most existing video conferencing systems provide only point-to-point video conferencing.

3. An MCU system can provide continuous presence multi-point video conferencing only if it can combine several incoming video channels into a single outgoing video stream that can be decoded by the equipment which receives the outgoing video stream.

4. When an MCU system combines several incoming video channels, difficulties arise:

a. Incoming streams may use different codec formats, e.g., H.261 or H.263.

b. Even if incoming streams have -the same codec format, they may have different picture types, e.g., I picture or P picture.

c. Even if incoming streams have the same codec format and the same picture type, they each may have or utilize different quantizers. This makes the adjustment of the DCT coefficients necessary and at the same time introduces errors.

d. Video frames in each of the video channels ordinarily arrive at different times. When the MCU awaits the arrival of a frame or frames from each video channel, a time delay results.

e. If the MCU waits for the arrival of a frame or frames from each video channel, operation of the MCU is, in substance, controlled by the channel with the slowest frame rate.

f. An existing technique for solving the non-synchronized frame rate problem mentioned above is to substitute the slower channels with the previous images, so that the faster channels are updated while the slower ones remain the same. But this practice takes a significant amount of memory for buffering the images and it may mean each image has to be fully decoded and encoded.

Accordingly, it would be highly desirable to provide an improved video conferencing system which could, in essence, provide continuous presence multi-point video conferencing while avoiding some or all of the various problems in prior art MCU systems.

Therefore, it is a principal object of the instant invention to provide an improved video conferencing system.

A further object of the invention is to provide an improved method and apparatus for providing a continuous presence multi-point video conferencing system.

Another object of the invention is to provide an improved continuous presence multi-point video conferencing system which significantly simplifies and reduces the expense of existing multi-point video conferencing systems.

BRIEF DESCRIPTION OF THE SEVERAL VIEWS OF THE DRAWING(S)

These, and other and further and more specific objects of the invention will be apparent to those skilled in the art based on the following description, taken in conjunction with the drawings, in which.

Figure 1:
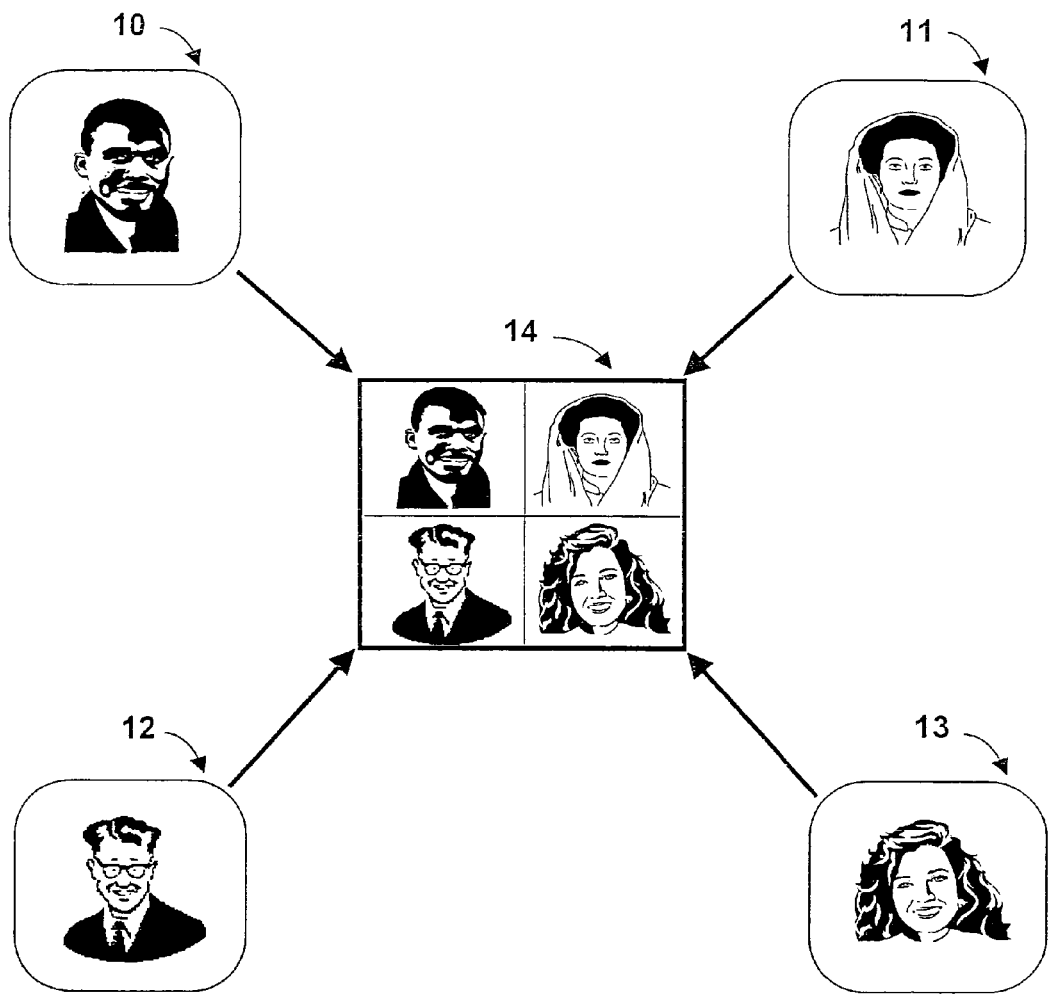
FIG. 1 is diagram illustrating the screen of a participant in a video conferencing system constructed in accordance with the invention.

FIG. 3 is a diagram illustrating an incoming QCIF frame for the left upper quadrant of an outgoing H.261 CIF video stream and indicating information contained in the outgoing H.261 CIF video stream, illustrating an incoming QCIF frame for the right upper quadrant of an outgoing H.261 CIF video stream and indicating information contained in the outgoing H.261 CIF video stream, illustrating an incoming QCIF frame for the lower left quadrant of an outgoing H.261 CIF video stream and indicating information contained in the outgoing H.261 CIF video stream, and, illustrating an incoming QCIF frame for the lower right quadrant of an outgoing H.261 CIF video stream and indicating information contained in the outgoing H.261 CIF video stream;

Figure 4:
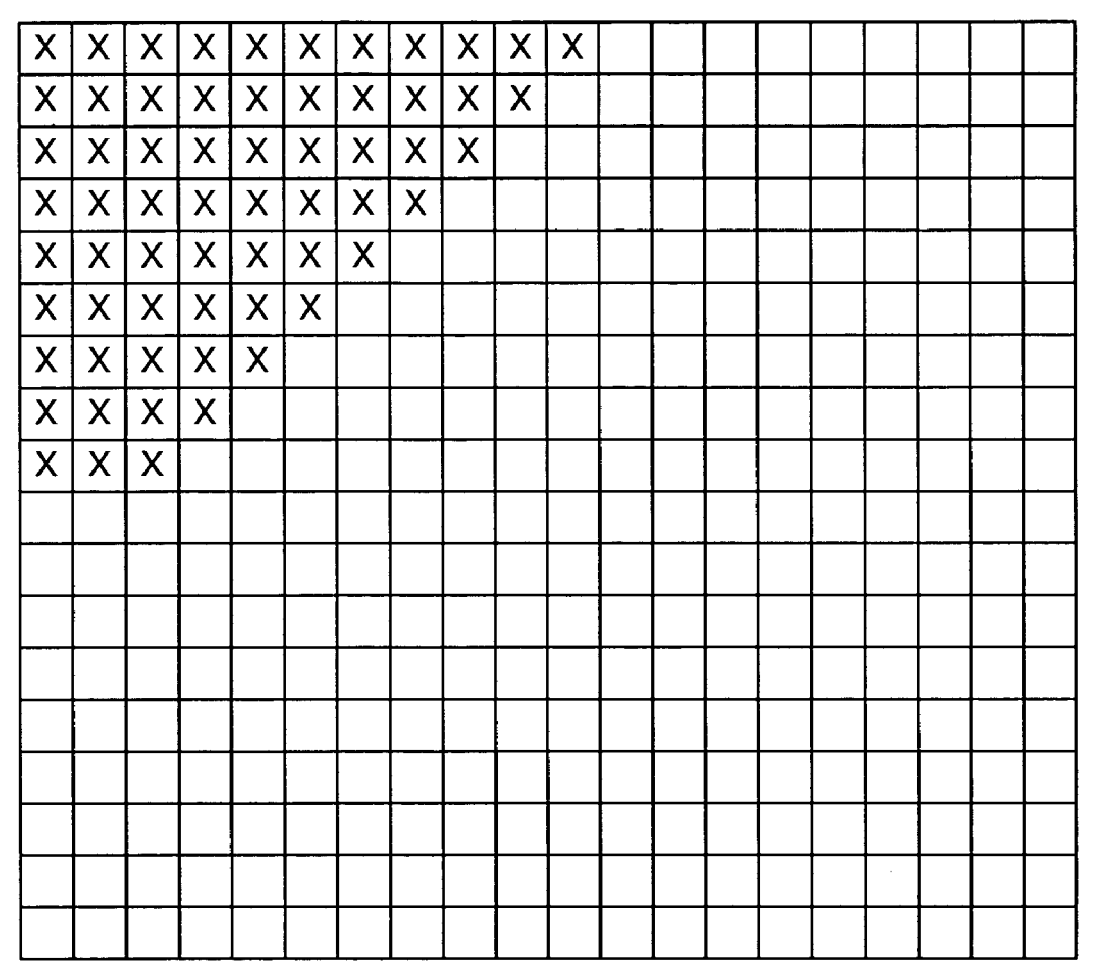

FIG. 4 is a diagram illustrating how the motion vector data (MVD) of an incoming H.263 QCIF picture frame should be readjusted when it is incorporated in an outgoing H.263 CIF picture frame because it may refer to different macro block (MB) in the CIF picture;

FIG. 5 illustrates the information contained in a CIF video stream produced from an incoming QCIF I picture and an incoming QCIF P picture using the H.263 codec format; and, FIG. 6 is a diagram illustrating how the group number (GN) in an incoming QCIF frame may be changed when the QCIF frame coded in H.261 is incorporated in an outgoing CIF video stream coded in H.261.

During a video conference, video data are segmented into packets before they are shipped through the network. A packet is an individual object that travels through the network and contains one or a fraction of a picture frame. The header of each packet provides information about that packet, such as whether the packet contains the end of a frame. With this end-of-frame packet and the previous packets, if it applies, the MCU gets all the data for a new picture frame. Therefore, a MCU can tell if a new frame is received in a video channel just by reading the packet header. Also, at the very beginning of a video conference, before any video packet can be sent, there is a call setup process which checks each participant's capabilities, such as what kind of video codec is used. Once the call setup is done, each video channel carries video streams only in a certain standard codec format, i.e., H.261 or H.263.

BRIEF SUMMARY OF THE INVENTION

Briefly, in accordance with the invention, we provide an improved method for receiving frames from at least first and second incoming video channels and for alternately continuously transmitting individual frames in at least a first outgoing video stream to a first equipment apparatus for receiving the first video stream and generating a video image including pictures from both of the incoming video channels, and a second outgoing video stream to a second equipment apparatus for receiving the second video stream and generating a video image including pictures from both of the incoming video channels. The method includes the steps of matching the codec format of the new frame, when there is a new frame available, to that of at least the first equipment apparatus; generating, after matching the codec format of the new frame to that of the first equipment apparatus, a revised frame by altering at least one header and coded domain data, if necessary, in the available frame according to a selected picture format; generating steady state data which indicates that there is no change in the picture for the video channel which does not provide any new frame; combining the revised frame produced and the steady state data produced to generate a video signal in the first outgoing video stream. The first equipment apparatus receives the video signal and produces a video image including a picture from one of the channels generated from the revised frame, and including a picture from the remaining channel which exists prior to receipt of the video signal by the first equipment apparatus and which, based on the steady state data in the video signal, remains unchanged.

In another embodiment of the invention, we provide improved apparatus for receiving frames from at least first and second incoming video channels and for alternately continuously transmitting individual frames in at least a first outgoing video stream to a first equipment apparatus for receiving the first video stream and generating a video image including pictures from both of the incoming video channels, and a second outgoing video stream to a second equipment apparatus for receiving the second video stream and generating a video image including pictures from both of the incoming video channels. The improved apparatus includes apparatus, when there is a new frame available, to match the codec format of the new frame to that of at least the first equipment apparatus; apparatus to generate, after the codec format of the new frame is matched to that of the first equipment apparatus, a revised frame by altering at least one header and coded domain data, if necessary, in the new frame according to a selected picture format; apparatus to generate steady state data which indicates that there is no change in the picture for the video channel which does not provide any new frame; apparatus to combine the revised frame and the steady state data to generate a video signal in the first outgoing video stream. The first equipment apparatus receives the video signal and produces a video image including a picture from one of the channels generated from the revised frame in the video signal, and including a picture from the other channel which exists prior to receipt of the video signal by the first equipment apparatus and which, based on the steady state data in the video signal, remains unchanged.

In a further embodiment of the invention, we provide an improved method for receiving frames from at least first and second incoming video channels and for alternately continuously transmitting individual frames in at least a first outgoing video stream to a first equipment means for receiving the first video stream and generating a video image including pictures from both of the incoming video channels, and a second outgoing video stream to a second equipment means for receiving the second video stream and generating a video image including pictures from both of the incoming video channels. The improved method includes the steps of, when there is a new frame available, using the coded domain data in the frame without fully decoding the coded domain data; and, changing at least one header and coded domain data, if necessary, to generate a video signal in the first outgoing video stream. The first equipment apparatus receives the video signal and produces a video image. The video image includes a picture for one of the channels generated from the coded domain data.

DETAILED DESCRIPTION OF THE INVENTION

Turning now to the drawings, which describe the presently preferred embodiments of the invention for the purpose of describing the operation and use thereof and not by way of limitation of the scope of the invention, and in which like reference characters refer to corresponding elements throughout the several views, the following terms and definitions therefore as utilized herein.

Block. A block is the fourth hierarchical layer in video syntax. Data for a block consists of code words for transform coefficients. The size of a block is 8 by 8. This term is used in both H.261 and H.263 codec formats.

Chrominance. The difference determined by quantitative measurements between a color and a chosen reference color of the same luminous intensity, the reference color having a specified color quality. This term is used in connection with H.261, H.263, and other codec formats.

CIF. CIF stands for common intermediate format. CIF is a picture format which has, for luminance, 352 pixels per horizontal line and 288 lines, and has, for chrominance, 176 pixels per horizontal line and 144 lines.

COD. COD stands for coded macroblock indication and is used in connection with the H.263 codec format. A COD is one data bit in the header of a macroblock (MB) in an INTER picture. If the data bit is set to "1", no further information is transmitted; in another words, the picture associated with and defined by this macroblock does not change on the participant's screen and remains the same.

Coded domain data. This is coded compressed data. In the presently preferred embodiment of the invention the MCU receives coded domain QCIF data and sends coded domain CIF data. This term is used in connection with H.261, H.263, and other codec formats.

CPBY. CPBY stands for coded block pattern for luminance and is used in connection with the H.263 codec format. A CPBY is a variable length code word in the header of a macroblock (MB) which describes data in the macroblock.

DCT. DCT stands for discrete cosine transformation. This transformation is used to compress data and to eliminate unnecessary information. DCT is used by the coding device of the participant. This term is used in connection with H.261, H.263 and other codec formats.

Frame. A frame is one digital picture in a sequential series of pictures in a video channel or other video stream. This term is used in connection with H.261, H.263, and other codec formats.

Frame rate. The frame rate is the rate in frames per second that a MCU receives. The frame rate currently typically is about thirty frames per second. This term is used in connection with H.261, H.263, and other codec formats.

GOB. GOB stands for group of blocks. A GOB is the second hierarchical layer in video syntax. This term is used in connection with the H.261 and H.263 codec formats.

GN. GN stands for group of block number. A GN consists of 4 bits in H.261's header and 5 bits in H.263's header for a group of blocks. Only the GN in H.261 is used in the practice of the invention. The data bits indicate the position of the group of blocks in a picture, i.e., upper left, upper right, lower left, lower right.

Header (or header file). A header is information included at the beginning of a picture, group of blocks, macroblock or block of information. The header describes the information which follows the header. This term is used in connection with the H.261 and H.263 codec formats.

Horizontal component. The horizontal component is the pixels along a horizontal line. This term is used in connection with the H.261 and H.263 codec formats.

H.261 codec format. A standard format for coding and decoding digitized video data. The format is provided by ITU-T.

H.263 codec format. A standard format for coding and decoding digitized video data. The format is provided by ITU-T.

IDCT. IDCT stands for inverse discrete cosine transformation. The IDCT is used to reverse or decode the DCT. This term is used in connection with the H.261 and H.263 codec formats.

INTRA. This is an I-picture. An INTRA is a picture or a macroblock type that has no reference picture(s) for prediction purposes. This term is used in connection with the H.263 codec format.

INTER. This is a P-picture. An INTER is a picture or a macroblock type that has a temporally previous reference video data. This term is used in connection with the H.263 codec format.

Layer. A layer is one level of hierarchy in video syntax, comprising a quantity of digitized data or information.

Lower layer. A lower layer is a layer in video syntax which is a part of an upper layer and is lower than the picture layer. This term is used in connection with the H.261 and H.263 codec formats.

Luminance. Luminance is the luminous intensity of a surface in a given direction per unit of projected area. This term is used in connection with the H.261, H.263, and other codec formats.

Macroblock. A macroblock (MB) is digital data or information.

A MB includes blocks and a header. This term is used in connection with the H.261 and H.263 codec formats.

Mapping. Mapping is modifying headers and coded domain data, if necessary, in the video syntax for a H.261 or H.263 QCIF frame so that the QCIF frame looks like a H.261 or H.263 CIF frame with the QCIF data in one quarter (or some other portion) of the CIF frame area. Although mapping changes or alters headers and other information such as the coded domain data, it ordinarily does not change the portions of the signal which define the pixels comprising the picture of a participant that is produced on the participant's screen of video equipment. This term is used in connection with the H.261 and H.263 codec formats.

MB. MB stands for macroblock, which is defined above.

MBA. MBA stands for macroblock address. The MBA is a variable length code word in the header of a MB that indicates the position of the MB within a group of blocks. This term is used in connection with the H.261 codec format.

MCBPC. MCBPC indicates of the macroblock type and coded block pattern for chrominance, and consists of a variable length code word in the header of a MB. This term is used in connection with the H.263 codec format.

MCU. MCU stands for multi-point control (or conference) unit. A conventional MCU can operate in a switched presence format or in a continuous presence format. In the switched presence format, the MCU receives video bit-streams from more than one participant, selects only one of the video bit-streams and transmits it simultaneously to each participant in a video conference. In the continuous presence format, the MCU receives video bit-streams from more than one participant, and simultaneously transmits each stream in a split screen format to each participant in the video conference. The MCU utilized in the practice of the invention at any instant in time only transmits one frame of one incoming video signal plus some additional data added to the frame to facilitate retransmission of the frame to a participant in a video conference. This term is used in connection with the H.261, H.263, and other codec formats MVD. MVD stands for motion vector data. An MVD is a variable length code word in the header of a macroblock for the horizontal component followed by a variable length code word for the vertical component. This term is used in connection with the H.263 codec format.

NOT COD. NOT COD means the COD is set to "1". This term is used in connection with the H.263 codec format.

Non-reference picture. A non-reference picture is a skipped picture frame that is received from a participant by the MCU and is skipped and not retransmitted by the MCU. A non-reference picture frame ordinarily is not retransmitted because it is identical, or nearly identical, to the frame which was just previously transmitted by the MCU. This term is used in connection with the H.261 and H.263 codec formats.

Picture. A picture is the first hierarchical layer in video syntax. The information included in a picture is a header file plus the GOB. This term is used in connection with the H.261 and H.263 codec formats.

Point-to-point function. In a point-to-point function video conferencing system, only two participants are involved. Such a system allows the first person's picture to be sent to the second person or vice-versa.

The video of the first person is not combined with the video of another person before it is sent to the second person.

QCIF. QCIF stands for quarter-common intermediate format. QCIF is a picture format which has, for luminance, 176 pixels per horizontal line and 144 lines, and has, for chrominance, 88 pixels per horizontal line and 72 lines.

Quantizer. A quantizer is data that indicates the accuracy of the picture data.

TR. Temporal reference. As used in connection with the H.263 codec format, the TR comprises eight bits of data in the header of a picture layer. This data is produced by incrementing its value in the temporally previous reference picture header by one plus the number of skipped or non-reference pictures at the picture clock frequency since the previously transmitted picture. As used in connection with the H.261 codec format, the TR comprises five bits of data in the header of a picture layer and is data that is produced by incrementing its value in the temporally previous reference picture header by one plus the number of skipped or non-reference pictures at the picture clock frequency since the previously transmitted picture.

Video syntax. Video syntax is digitized data that describes and defines a video frame. Video syntax is a defined arrangement of information contained in a video frame. The information is arranged in a hierarchical structure which has four layers:
Picture
Group of blocks (GOB)
Macroblocks (MB)
Blocks
Each layer includes a header file.

In the following description of the presently preferred embodiments of the invention, it is assumed that there are four participants in a video conference and that each participant has video conferencing equipment which generates video signals comprising a video channel which is received by a MCU constructed in accordance with the invention. As would be appreciated by those of skill in the art, the apparatus and method of the invention can be utilized when there are two or more participants in a video conference. The method and apparatus of the invention ordinarily are utilized when there are three or more participants in a video conference.

In the video conferencing system of the invention, the MCU generates an outgoing CIF signal. The MCU divides the outgoing CIF signal into orthogonal quarters, namely, an upper left quarter, an upper right quarter, a lower left quarter, and a lower right quarter. Each incoming channel from a participant comprises a QCIF signal. Each channel is assigned to one of the orthogonal quarters of the outgoing CIF signal. When a frame arrives at the MCU in one of the channels, the frame is assigned by the MCU to the orthogonal quarter of the outgoing CIF signal that is reserved or selected for that channel.

It is understood that a variety of codec formats exist and can be incorporated into the invention. However, for the following discussion it is assumed that the video equipment utilized by each participant in a video conference utilizes either the H.261 or H.263 codec format. And, more specifically, it is assumed that the incoming signal 10 (from the first participant) is in the H.261 codec format and that incoming signals 11 (from the second participant), 12 (from the third participant), 13 (from the fourth participant) in FIG. 1 are in the H.263 codec format. This means that the outgoing signal 14 (FIG. 1) produced by the MCU for the first participant will be in the H.261 codec format and that the outgoing signal 14 produced by the MCU for the second, third, and fourth participants will be in the H.263 codec format.

Since the MCU is, at any instant, basically updating only one-quarter of the outgoing CIF signal, the structure of the MCU of the invention is, in comparison to conventional MCUs, simplified, and, the computation power required to operate the MCU of the invention is, in comparison to conventional MCUs, significantly reduced. Also, since the MCU of the invention works, in contrast to conventional MCUs, only on rearranging coded domain data (generally without decoding the coded domain data), the MCU of the invention requires only small amount of memory. This reduction in complexity, computation power, and memory size enables a conventional personal computer (PC) to be employed in the practice of the invention.

As noted above, for sake of this example, it is assumed that there are four participants in a video conference. The video equipment of the first participant produces a channel comprising an incoming QCIF signal 10. The video equipment of the second participant produces a channel comprising an incoming QCIF signal 11. The video equipment of the third participant produces a channel comprising an incoming QCIF signal 12. The video equipment of the fourth participant produces a channel comprising an incoming QCIF signal 13. The camera, computer, CRT or other video screen, and other video equipment used by each participant to produce a channel comprising a QCIF signal is well known in the art and will not be described in detail herein.

The MCU receives the incoming QCIF signals 10, 11, 12, 13 and combines them into an outgoing CIF signal 14. Please see FIG. 1. Each QCIF signal comprises a stream of digital frames or pictures. Digital frames in QCIF signal 10 are utilized to update the upper left quadrant of an outgoing CIF signal 14. Digital frames in QCIF signal 11 are utilized to update the upper right quadrant of an outgoing CIF signal 14. Digital frames in QCIF signal 12 are utilized to update the lower left quadrant of an outgoing CIF signal 14. Digital frames in QCIF signal 13 are utilized to update the lower right quadrant of an outgoing CIF signal 14. In the presently preferred embodiment of the invention, each time a new CIF signal 14 is generated by the MCU, the new CIF signal contains information which basically only changes the picture in one quadrant of the CIF signal. As would be appreciated by those of skill in the art, it is possible in accordance with the invention to configure the MCU such that each time a new CIF signal 14 is generated, the picture in two or more quadrants of the CIF signal are changed. But in the presently preferred embodiment of the invention, only the picture in one quadrant of the CIF signal is changed each time a new CIF signal is generated by the MCU.

As would be appreciated by those of skill in the art, each incoming channel can comprise a sub-QCIF signal, and the outgoing signal can be a QCIF signal which contains a portion of each sub-QCIF picture. As is well known, a sub-QCIF signal is not one quarter the size of a QCIF signal. By extracting a portion of each sub-QCIF picture, these portions can still add up to a QCIF picture. Or, each incoming channel can comprise a CIF signal and the outgoing signal can be a 4CIF signal. Or, each incoming channel can comprise a 4CIF signal and the outgoing signal can be a 16CIF signal, etc. Or, other standardized or non-standardized picture formats can be adopted. In the continuous presence mode of H.263, at most four video signals can be transmitted. This is in direct contrast to the capability of some possible embodiments of the invention in which, for example, four CIF pictures, each contains four QCIF pictures, can add up to one 4CIF picture containing the pictures of sixteen participants. Also, pictures of different sizes can also be accommodated in the invention. For example, an outgoing 4CIF signal can contain two incoming CIF signals in its upper left and upper right quadrants while its lower left and lower right quadrants can contains eight QCIF signals.

It is understood that one signal 10 may transmit new frames or pictures to the MCU at a higher or slower rate than signals 11, 12, 13. This does not alter operation of the MCU, because the MCU basically operates on a first-come, first-serve basis. E.g., as soon as the MCU receives a frame or picture from a signals 10 to 13, it processes that particular frame and generates and transmits a CIF signal 14 to the video equipment of each of the participants. The MCU then processes the next frame it receives and generates and transmits a CIF signal 14 to the video equipment of each of the participants, and so on. Since the equipment of one of the participants utilizes the H.261 codec format and the equipment of the remaining participants utilizes the H.263 codec format, each time the MCU receives and processes a frame via one of signals 10 to 13, the MCU generates both a CIF signal 14 in the H.261 codec format and a CIF signal 14 in the H.263 codec format.

If an incoming QCIF signal 10 is in the H.261 codec format and the outgoing CIF signal is in the H.263 format, a frame from the signal 10 is converted from the H.261 codec format to the H.263 codec format when the MCU is generating an outgoing signal 14 in the H.263 codec format. Similarly, if an incoming QCIF signals 11 to 13 is in the H.263 codec format and the outgoing CIF sign is in the H.261 codec format, a frame from the signals 11 to 13 is converted from the H.263 codec format to the H.261 codec format when the MCU is generating an outgoing signal 14 in the H.261 codec format.

EXAMPLE

PART I: CIF Signal Transmitted in H.263 Codec Format

In this part of the example, it is assumed that the MCU is processing incoming signals 10 to 13 to produce an outgoing signal 14 which is in the H.263 codec format, which outgoing signal 14 will be send to the second, third, and fourth participants identified above.

The MCU monitors the incoming signals 10 to 13 and waits to receive a new frame from one of signals 10 to 13. Signal 10 is the first signal to transmit a new QCIF frame to the MCU. The MCU alters the headers and coded domain data of the QCIF frame to change the frame from an H.261 codec format to the H.263 codec format. The altered headers indicate that the frame is an INTER picture (i.e., is a P picture). The MCU retains the digital data (i.e., the coded domain data) in the frame which defines the video picture of the first participant. Although the digital data which defines the video picture of the first participant may be rearranged by the MCU, the video picture which results is unchanged, or is substantially unchanged, by the MCU.

Figure 2:
FIG. 2 is a diagram illustrating the information contained in the outgoing H.263 video stream when the upper left quadrant of the video image is being changed, when the upper right quadrant of the video image is being changed, when the lower left quadrant of the video image is being changed, and when the lower right quadrant of the video image is being changed.
Figure 2:
Figure 2:
Figure 2:
Figure 3A:
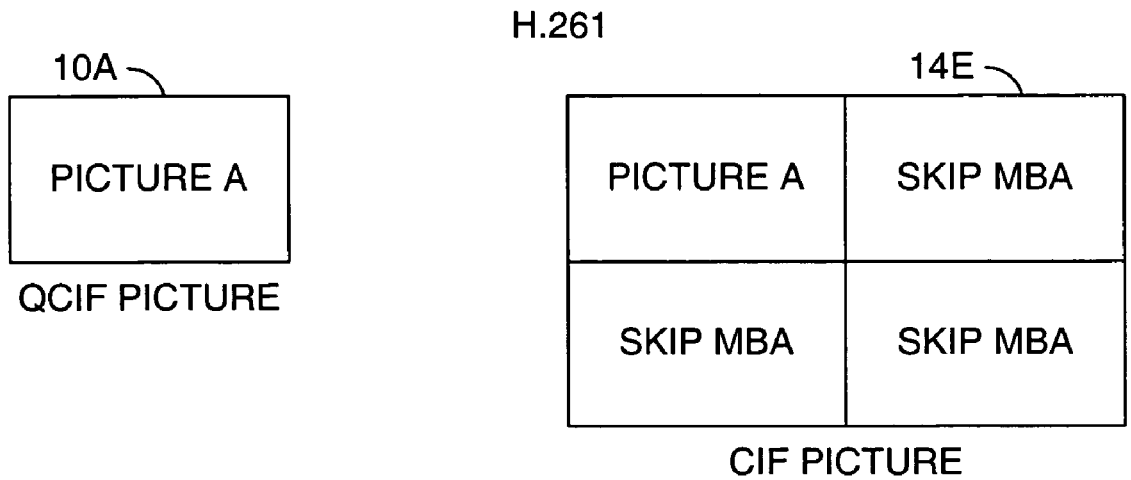
Figure 3A:
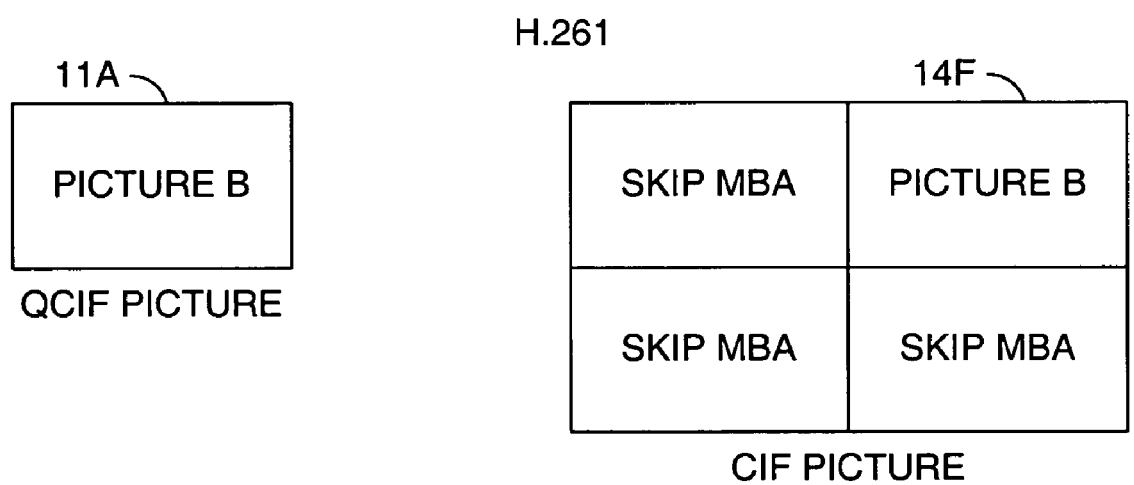
Figure 3B:
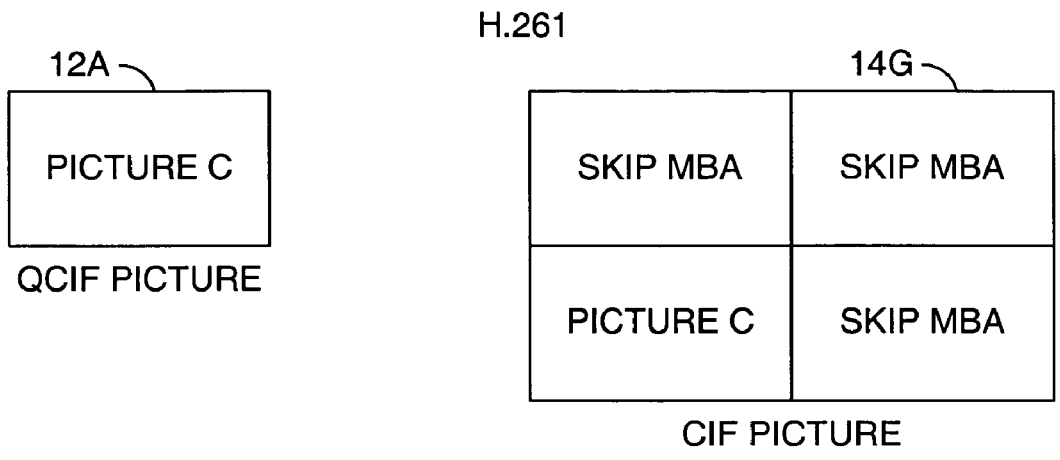
Figure 3B:
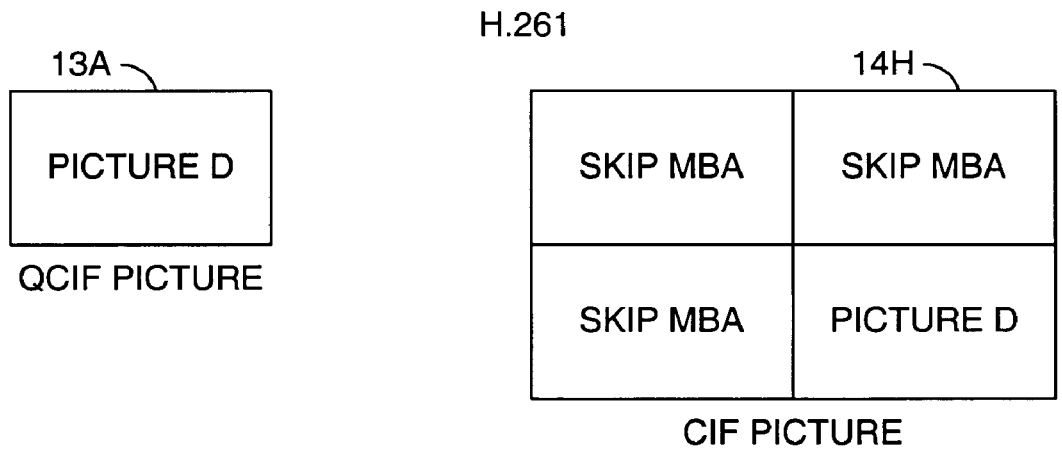

The MCU prepares outgoing CIF signal 14A depicted in FIG. 2. First, a CIF picture header which has a picture type of CIF and a picture coding type of INTER (P picture) is generated. Then, a proper temporal reference is assigned to the picture. The temporal reference indicates the number of non-transmitted pictures. When a B (Bidirectional-Interpolation) picture is used, the temporal reference indicates how many pictures are skipped and how to interpolate the skipped pictures. The method of the invention does not work when a B picture is used. Therefore, the temporal reference is incremented by 1 for each picture. The H.263 codec format includes a frame skipping feature which presently is not utilized in the practice of the invention.

Since frames received from QCIF signal 10 are assigned to the upper left quadrant of an outgoing CIF signal 14, the MCU inserts in the upper left quadrant of the outgoing CIF signal 14 the QCIF frame produced by the MCU by converting the QCIF picture it receives via signal 10 from the H.261 codec format to the H.263 codec format. The MCU inserts in the MB headers for the lower left and the upper and lower right quadrants of CIF signal 14A the number or bit "1", which indicates NOT COD as shown in the CIF signal 14A in FIG. 2.

Since the new QCIF frame is in the upper left quadrant, each GOB data in the QCIF frame, from top to bottom, goes through necessary MVD modifications since it may refer to different MVD in the CIF picture. Only MVD in those MBs marked with x in FIG. 4 are unchanged. After each GOB goes through the necessary MVD modifications, it links up with eleven MB headers for the upper right quadrant (each of which is assigned the bit "1" to designate NOT COD) and becomes a new CIF GOB. Each of the MB headers for the lower left and lower right quadrants is filled with the bit "1" to designate NOT COD.

The resulting outgoing CIF signal 14A is illustrated in FIG. 2. When this signal is transmitted and is received by participants two, three, and four, the video equipment of these participants inserts the picture illustrated in the upper left quadrant in FIG. 14A in the upper left quadrant of the video picture shown on each of the participant's CRT or other screen. The pictures shown on the CRT in the remaining quadrants remain unchanged.

The MCU transmits CIF signal 14A to participants two, three, and four.

After transmitting CIF signal 14A, the MCU again monitors the incoming signals 10 to 13 in a round-robin fashion. Signal 11 is checked to see if it contains a new frame. If signal 11 does not contain a new frame, MCU moves on and checks if channel 12 contains a new frame and so on. If signal 11 contains a new frame, the following procedure will be followed.

Since the frame is already in the H.263 codec format, it is not necessary to change the frame from the H.261 codec format to the H.263 codec format.

This frame is found to be an INTRA picture (I picture). The MCU converts it into an INTER or P picture. At the macro block level, MB Type is set to INTRA or INTRA+Q if a quantizer is modified, and COD is added. MCBPC is transferred from the table for the I picture to the table for the P picture. CBPY takes the complement of its original value. This procedure for changing the headers and coded domain data, if necessary, to indicate an INTER picture is well known by those of ordinary skill in the art.

The MCU prepares outgoing CIF signal 14B depicted in FIG. 2. First, a CIF picture header which has a picture type of CIF and a picture coding type of INTER (P picture) is generated. Then, a proper temporal reference is assigned to the picture. The temporal reference indicates the number of non-transmitted pictures. The temporal reference is incremented by 1 for each picture in the method of the invention. The H.263 codec format includes a frame skipping feature which presently is not utilized in the practice of the invention.

Since frames received from QCIF signal 11 are assigned to the upper right quadrant of an outgoing CIF signal 14, the MCU inserts in the upper right quadrant of the outgoing CIF signal 14B the QCIF frame produced by the MCU by converting the QCIF I picture it receives via signal 11 into a QCIF P picture, both in H.263 codec format. Since the QCIF frame is in the upper right quadrant, every GOB data in the QCIF frame, from top to bottom, goes through necessary MVD modifications since it refers to different MVD in the CIF picture. After each GOB goes through the necessary MVD modifications, it links up with eleven MB headers for the upper left quadrant (each of which is assigned the bit "1" to designate NOT COD) and becomes a new CIF GOB. Each of the MB headers for the lower left and lower right quadrants is filled with the bit "1" to designate NOT COD.

The resulting outgoing CIF signal 14B is illustrated in FIG. 2. When this signal is transmitted and is received by participants two, three, and four, the video equipment of these participants inserts the picture illustrated in the upper right quadrant of FIG. 14B in the upper right quadrant of the video picture shown on each of the participant's CRT or other screen. The pictures shown on the CRT in the remaining quadrants remain unchanged.

The MCU transmits CIF signal 14B to participants two, three, and four.

The MCU again monitors the incoming signals 10 to 13 for a new incoming frame in a round-robin fashion. The MCU receives a new frame from signal 12.

Since the frame received from signal 12 is already in the H.263 codec format, it is not necessary to change the frame from the H.261 codec format to the H.263 codec format.

This frame is found to be an INTER picture (P picture). Therefore, the MCU does not need to convert it into P picture format.

The MCU prepares outgoing CIF signal 14C depicted in FIG. 2. First, a CIF picture header which has a picture type of CIF and a picture coding type of INTER (P picture) is generated. Then, a proper temporal reference is assigned to the picture. The temporal reference indicates the number of non-transmitted pictures. The temporal reference is incremented 1 for each picture in the method of the invention. The H.263 codec format includes a frame skipping feature which presently is not utilized in the practice of the invention.

Each of the eleven MB headers for the upper left and upper right quadrants of the outgoing CIF signal is filled with the bit "1" to designate NOT COD. Then, since frames received from QCIF signal 12 are assigned to the lower left quadrant of an outgoing CIF signal 14, the MCU inserts in the lower left quadrant of the outgoing CIF signal 14C the QCIF frame received by the MCU via signal 12. Since the QCIF frame is in the lower left quadrant, every GOB data in the QCIF frame, from top to bottom, goes through necessary MVD modifications since it refers to different MVD in the CIF picture. After each GOB goes through the necessary MVD modifications, it links up with eleven MB headers for the lower right quadrant (each of which is assigned the bit "1" to designate NOT COD) and becomes a new CIF GOB.

The resulting outgoing CIF signal 14C is illustrated in FIG. 2. When this signal is transmitted and is received by participants two, three, and four, the video equipment of these participants inserts the picture illustrated in the lower left quadrant of FIG. 14C in the lower left quadrant of the video picture shown on each of the participant's CRT or other screen. The pictures shown on the CRT in the remaining quadrants remain unchanged.

The MCU transmits CIF signal 14C to participants two, three, and four.

The MCU again monitors the incoming signals 10 to 13 for a new incoming frame in a round-robin fashion. The MCU receives a new frame from signal 13.

Since the frame received from signal 13 is already in the H.263 codec format, it is not necessary to change the frame from the H.261 codec format to the H.263 codec format.

This frame is found to be an INTER picture (P picture). Therefore, the MCU does not need to convert it into P picture format.

The MCU prepares outgoing CIF signal 14D depicted in FIG. 2. First, a CIF picture header which has a picture type of CIF and a picture coding type of INTER (P picture) is generated. Then, a proper temporal reference is assigned to the picture. The temporal reference indicates the number of non-transmitted pictures. The temporal reference is incremented 1 for each picture in the method of the invention. The H.263 codec format includes a frame skipping feature which presently is not utilized in the practice of the invention.

Each of the eleven MB headers for the upper left and upper right quadrants of the outgoing CIF signal is filled with the bit "1" to designate NOT COD. Then, since frames received from QCIF signal 13 are assigned to the lower right quadrant of an outgoing CIF signal 14, the MCU inserts in the lower right quadrant of the outgoing CIF signal 14D the QCIF frame received by the MCU via signal 13. Since the QCIF frame is in the lower right quadrant, every GOB data in the QCIF frame, from top to bottom, goes through necessary MVD modifications since it refers to different MVD in the CIF picture. After each GOB goes through the necessary MVD modifications, it links up with eleven MB headers for the lower left quadrant (each of which is assigned the bit "1" to designate NOT COD) and becomes a new CIF GOB.

The resulting outgoing CIF signal 14D is illustrated in FIG. 2. When this signal is transmitted and is received by participants two, three, and four, the video equipment of these participants inserts the picture illustrated in the lower right quadrant of FIG. 14D in the lower right quadrant of the video picture shown on each of the participant's CRT or other screen. The pictures shown on the CRT in the remaining quadrants remain unchanged.

The MCU transmits CIF signal 14D to participants two, three, and four.

PART II: CIF Signal Transmitted in H.261 Codec Format

In this part of the example, it is assumed that the MCU is processing incoming signals 10 to 13 to produce an outgoing signal 14 which is in the H.261 codec format, which outgoing signal 14 will be sent only to the first participant identified above.

The MCU again monitors the incoming signals 10 to 13 for a new incoming frame in a round-robin fashion. Signal 10 is the first signal to transmit a new frame 10A to the MCU. Since the frame is already in the H.261 codec format it is not necessary for the MCU to modify the frame from the H.263 codec format to the H.261 codec format.

The MCU prepares outgoing CIF signal 14E depicted in FIG. 3. First, a CIF picture header which has a picture type of CIF is generated. Then, a proper temporal reference is assigned to the picture.

Since frames received from QCIF signal 10 are assigned to the upper left quadrant of an outgoing CIF signal 14E, the MCU inserts in the upper left quadrant of the outgoing CIF signal 14E the QCIF frame received by the MCU via signal 10. If necessary, the GNs for the QCIF frame are altered to correspond to the GNs illustrated in FIG. 6. Since a QCIF frame in H.261 codec format has GNs 1, 3, 5 which match those of the upper left quadrant of a CIF frame in H.261 codec format, the GNs don't need to be altered.

The MCU fills the upper right quadrant of signal 14E with GOB headers each containing the correct GN 2, 4, or 6, as the case may be. The headers in each GOB are not followed by any macro block data. Similarly, the MCU fills the lower left quadrant of CIF signal 14E with GOB headers each containing the correct GN 7, 9, or 11, as the case may be. The headers in each GOB in the lower left quadrant are not followed by any macro block data. Finally, the MCU fills the lower right quadrant of CIF signal 14E with GOB headers each containing the correct GN 8, 10 or 12, as the case may be. The headers in each GOB for the lower right quadrant are not followed by any macro block data. When a GOB header, with a proper GN, is not followed by any additional macro block data, Skip MBA is indicated, which means that the picture in that quadrant is not updated by a participant's video equipment when the equipment receives that particular CIF signal 14E.

The resulting outgoing CIF signal 14E is illustrated in FIG. 3. When this signal is transmitted and is received by participant one, the video equipment of this participant inserts the picture contained in the QCIF frame in the upper left quadrant of the video picture shown on the participant's CRT or other screen. The pictures shown on the participant's CRT in the remaining quadrants remain unchanged.

After transmitting CIF signal 14E, the MCU again monitors the incoming signals 10 to 13 and waits to receive a new frame. The MCU receives a new frame 11A from signal 11.

Since the frame is in the H.263 codec format, the MCU changes the codec format to H.261 codec format. When the H.263 codec format is changed to the H.261 codec format, it makes no difference whether the incoming picture is a I picture or a P picture. The MCU retains the digital data (i.e., the coded domain data) in the frame which defines the video picture of the second participant. Although the digital data which defines the video picture of the second participant may be rearranged by the MCU, the video picture which results is unchanged, or is substantially unchanged, by the MCU.

The MCU prepares outgoing CIF signal 14F depicted in FIG. 3. First, a CIF picture header which has a picture type of CIF is generated. Then, a proper temporal reference is assigned to the picture.

Since frames received from QCIF signal 11A are assigned to the upper right quadrant of an outgoing CIF signal 14F, the MCU inserts in the upper right quadrant of the outgoing CIF signal 14F the QCIF frame produced by the MCU by converting the QCIF picture it receives via signal 11A from the H.263 codec format to the H.261 codec format. The GNs for the QCIF frame are altered to correspond to the GNs illustrated in FIG. 6. Since the QCIF frame has GNs of 1, 3 and 5, these numbers are changed to 2, 4, and 6 because the QCIF frame is inserted in the upper right quadrant of the outgoing CIF signal. The GNs for the upper right quadrant of the CIF signal 14F must, as shown in FIG. 6, be 2, 4, 6.

The MCU fills the upper left quadrant of signal 14F with GOB headers each containing the correct GN 1, 3, or 5, as the case may be. The headers in each GOB are not followed by any macro block data. Similarly, the MCU fills the lower left quadrant of CIF signal 14F with GOB headers each containing the correct GN 7, 9, or 11, as the case may be. The headers in each GOB in the lower left quadrant are not followed by any macro block data. Finally, the MCU fills the lower right quadrant of CIF signal 14F with GOB headers each containing the correct GN 8, 10 or 12, as the case may be. The headers in each GOB for the lower right quadrant are not followed by any macro block data. When a GOB header, with a proper GN, is not followed by any additional macro block data, Skip MBA is indicated, which means that the picture in that quadrant is not updated by a participant's video equipment when the equipment receives that particular CIF signal 14F.

The resulting outgoing H.261 codec format CIF signal 14F is illustrated in FIG. 3. When this signal is transmitted and is received by participant one, the video equipment of this participant inserts the picture contained in the QCIF frame in the upper right quadrant of the video picture shown on the CRT or other screen of participant one. The pictures shown on the participant's CRT in the remaining quadrants remain unchanged.

After transmitting CIF signal 14F, the MCU again monitors the incoming signals 10 to 13 and waits to receive a new frame. The MCU receives a new frame 12A from signal 12.

Since the frame is in the H.263 codec format, the MCU changes the codec format to H.261. When the H.263 codec format is changed to the H.261 codec format, it makes no difference whether the incoming picture is an I picture or a P picture. The MCU retains the digital data (i.e., the coded domain data) in the frame which defines the video picture of the third participant. Although the digital data which defines the video picture of the third participant may be rearranged by the MCU, the video picture which results is unchanged, or is substantially unchanged, by the MCU.

The MCU prepares outgoing CIF signal 14G depicted in FIG. 3. First, a CIF picture header which has a picture type of CIF is generated. Then, a proper temporal reference is assigned to the picture.

Since frames received from QCIF signal 12A are assigned to the lower left quadrant of an outgoing CIF signal 14G, the MCU inserts in the lower left quadrant of the outgoing CIF signal 14G the QCIF frame produced by the MCU by converting the QCIF picture it receives via signal 12A from the H.263 codec format to the H.261 codec format. The GNs for the QCIF frame are altered to correspond to the GNs illustrated in FIG. 6. Since the QCIF frame has default GNs of 1, 3 and 5, these numbers are changed to 7, 9, and 11 because the QCIF frame is inserted in the lower left quadrant of the outgoing CIF signal. The GNs for the lower left quadrant of the CIF signal 14G must, as shown in FIG. 6, be 7, 9, 11.

The MCU fills the upper left quadrant of signal 14G with GOB headers each containing the correct GN 1, 3, or 5, as the case may be. The headers in each GOB are not followed by any macro block data. Similarly, the MCU fills the upper right quadrant of CIF signal 14G with GOB headers each containing the correct GN 2, 4, 6, as the case may be. The headers in each GOB in the upper right quadrant are not followed by any macro block data. Finally, the MCU fills the lower right quadrant of CIF signal 14G with GOB headers each containing the correct GN 8, 10 or 12, as the case may be. The headers in each-GOB for the lower right quadrant are not followed by any macro block data. When a GOB header, with a proper GN, is not followed by any additional macro block data, Skip MBA is indicated, which means that the picture in that quadrant is not updated by a participant's video equipment when the equipment receives that particular CIF signal 14G.

The resulting outgoing H.261 codec format CIF signal 14G is illustrated in FIG. 3. When this signal is transmitted and is received by participant one, the video equipment of this participant inserts the picture contained in the QCIF frame in the lower left quadrant of the video picture shown on the CRT or other screen of participant one. The pictures shown on the participant's CRT in the remaining quadrants remain unchanged.

After transmitting CIF signal 14G, the MCU again monitors the incoming signals 10 to 13 and waits to receive a new frame. The MCU receives a new frame 13A from signal 13.

Since the frame is in the H.263 codec format, the MCU changes the codec format to H.261. When the H.263 codec format is changed to the H.261 codec format, it makes no difference whether the incoming picture is an I picture or a P picture. The MCU retains the digital data (i.e., the coded domain data) in the frame which defines the video picture of the fourth participant. Although the digital data which defines the video picture of the fourth participant may be rearranged by the MCU, the video picture which results is unchanged, or is substantially unchanged, by the MCU.

The MCU prepares outgoing CIF signal 14H depicted in FIG. 3. First, a CIF picture header which has a picture type of CIF is generated. Then, a proper temporal reference is assigned to the picture.

Since frames received from QCIF signal 13A are assigned to the lower right quadrant of an outgoing CIF signal 14H, the MCU inserts in the lower right quadrant of the outgoing CIF signal 14H the QCIF frame produced by the MCU by converting the QCIF picture it receives via signal 13A from the H.263 codec format to the H.261 codec format. The GNs for the QCIF frame are altered to correspond to the GNs illustrated in FIG. 6. Since the QCIF frame has GNs of 1, 3 and 5, these numbers are changed to 8, 10, and 12 because the QCIF frame is inserted in the lower right quadrant of the outgoing CIF signal. The GNs for the lower right quadrant of the CIF signal 14H must, as shown in FIG. 6, be 8, 10, 12.

The MCU fills the upper left quadrant of signal 14H with GOB headers each containing the correct GN 1, 3, or 5, as the case may be. The headers in each GOB are not followed by any macro block data. Similarly, the MCU fills the upper right quadrant of CIF signal 14H with GOB headers each containing the correct GN 2, 4, 6, as the case may be. The headers in each GOB in the upper right quadrant are not followed by any macro block data. Finally, the MCU fills the lower left quadrant of CIF signal 14H with GOB headers each containing the correct GN 7, 9, 11, as the case may be. The headers in each GOB for the lower left quadrant are not followed by any macro block data. When a GOB header, with a proper GN, is not followed by any additional macro block data, Skip MBA is indicated, which means that the picture in that quadrant is not updated by a participant's video equipment when the equipment receives that particular CIF signal 14H.

The resulting outgoing H.261 codec format CIF signal 14H is illustrated in FIG. 3. When this signal is transmitted and is received by participant one, the video equipment of this participant inserts the picture contained in the QCIF frame in the lower right quadrant of the video picture shown on the CRT or other screen of participant one. The pictures shown on the participant's CRT in the remaining quadrants remain unchanged.

As would be appreciated by those of skill in the art, a variety of codec formats other than H.263 and H.261 exist and can be utilized in accordance with the invention to receive and transmit only one frame at a time from a plurality of incoming channels during a videoconference between a plurality of participants.

The equipment needed to transmit to the MCU the QCIF (or other) signals from each participant in a video conference and to transmit CIF (or other) signals from the MCU to selected ones of the participants in a video conference is well known and is not described in detail herein.

Instead of transmitting in a quadrant of a CIF signal 14 a picture of a video conference participant, other information can be transmitted. For example, video clips, documents, spread sheets, presentations can be integrated into CIF signal 14 and appear, for example, in the lower right quadrant (or other quadrant) instead of a picture of one of the participants in the video conference.

The invention claimed is:

1. A method for generating a video output signal, comprising the steps of:
   (A) receiving, by multipoint control unit a plurality of input video signals each having (i) a plurality of frames stored in a coded video format and (ii) one of a plurality of frame rates; and
   (B) generating said video output signal comprising a plurality of frames, wherein (a) a first of said frames of said video output signal comprises (i) a coded portion representing one of said frames of a first of said plurality of input video signals and (ii) an uncoded portion for each of said plurality of input video signals other than said first of said plurality of input video signals and (b) a second of said frames of said video output signal comprises (i) a coded portion representing one of said frames of a second of said plurality of input video signals and (ii) an uncoded portion for each of said plurality of input video signals other than said second of said plurality of input video signals, wherein (i) each of said frames of said video output signal is generated as soon as one of the frames of said plurality of input signals is received, (ii) each of said frames of said video output signal comprises only one coded portion representing the respective one of the frame of said plurality of input video signals that is received, and (iii) all of the frames of said video output signal comprise only one coded portion per frame.

2. The method according to claim 1, wherein step (B) generates additional frames of said video output signal in response to additional frames of said input video signals, wherein each of said additional frames of said video output signal comprises (i) a coded portion of a first of said additional frames of said input video signals and (ii) an uncoded portion for each of said video input signals other than said first of said additional frames of said video input signals.

3. The method according to claim 1, wherein said video output signal comprises a video conference signal suitable for transmission over a computer network.

4. The method according to claim 1, wherein said coded frames comprise picture data.

5. The method according to claim 4, wherein said video output signal transmits new picture data for only one of said plurality of input video signals during any given transmission.

6. The method according to claim 1, wherein (i) each of said plurality of input video signals is received from a respective one of a plurality of participants in a video conference and (ii) said output video signal is presented to each of said plurality of participants.

7. The method according to claim 1, wherein each of said plurality of input signals operates at a different frame rate.

8. The method according to claim 1, wherein said uncoded portions indicate that a previously received coded portion should be repeated.

9. The method according to claim 1, wherein said coded and uncoded portions are compliant with a particular video coding standard.

10. The method according to claim 9, wherein said particular video coding standard comprises H.261.

11. The method according to claim 9, wherein said particular video coding standard comprises H.263.

12. The method according to claim 1, wherein said method is implemented in a multi-point control unit.

13. The method according to claim 1, wherein said video output signal comprises a common intermediate format (CIF) picture stream.

14. The method according to claim 1, wherein said video output signal is capable of being decoded by a decoder compliant with a particular video standard.

15. The method according to claim 1, further comprising the step of:

(D-1) prior to step (B), determining whether said frames in said plurality of input video signals are inter coded frames or intra coded frames:

(D-2) if said frames are intra coded frames, converting to inter coded frames prior to step (B);

(D-3) if said frames are inter coded frames, continuing to step (B); and (D-4) repeating steps (D-1) to (D-3) for each of said frames of each of said input video signals.

16. The method according to claim 15, wherein each of said frames of said output video signal comprise inter coded frames.

17. The method according to claim 1, wherein said frames of said output video signal are generated at a rate that is not constant.

18. The method according to claim 1, wherein said frames of said output video signal are generated at a frame rate greater than said frame rates of said plurality of input signals.

19. The method according to claim 1, wherein said method only presents a frame of said output video signal in response to a new frame of one of said plurality of input video signals being received.

* * * * *